US012640052B2

(12) United States Patent
Alkhalily et al.

(10) Patent No.: US 12,640,052 B2
(45) Date of Patent: May 26, 2026

(54) 3D REGROUPING FOR HANDS ON LEARNING

(71) Applicants: Basel Alkhalily, Tomball, TX (US);
Mona Elhalabi, Tomball, TX (US)

(72) Inventors: Basel Alkhalily, Tomball, TX (US);
Mona Elhalabi, Tomball, TX (US)

(73) Assignee: Basel Alkhalily, Tomball, TX (US)

( * ) Notice: Subject to any disclaimer, the term of this
patent is extended or adjusted under 35
U.S.C. 154(b) by 1079 days.

(21) Appl. No.: 17/403,210

(22) Filed: Aug. 16, 2021

(65) Prior Publication Data

US 2023/0051559 A1     Feb. 16, 2023

(51) Int. Cl.
*G09B 19/02* (2006.01)
(52) U.S. Cl.
CPC .................................... *G09B 19/02* (2013.01)
(58) Field of Classification Search
None
See application file for complete search history.

(56) References Cited

U.S. PATENT DOCUMENTS

| | | | | |
|---|---|---|---|---|
| 5,683,252 A | * | 11/1997 | Tsao | A63F 9/0098 |
| | | | | 434/208 |
| 5,769,639 A | | 6/1998 | Foster | |
| 5,980,258 A | * | 11/1999 | Kohlberg | G09B 19/025 |
| | | | | 434/208 |
| 6,758,675 B2 | | 7/2004 | Karabaic | |
| 7,018,210 B2 | | 3/2006 | Goldman et al. | |
| 7,104,799 B1 | | 9/2006 | Sansing | |
| 7,614,881 B2 | | 11/2009 | Bagies | |
| 2011/0111378 A1 | | 5/2011 | Nguyen | |

FOREIGN PATENT DOCUMENTS

GB                2299888 A  *  10/1996  ............... G09B 1/00

* cited by examiner

*Primary Examiner* — James B Hull

(57)        ABSTRACT
The present invention relates to a mathematical learning module for educating students learning arithmetic through kinesthetic learning and relates particularly to a system that explains the concept of regrouping in carrying forward and borrowing by introducing the concept for two- or three-digit number regrouping. This type of learning can lead to increased retention of the material and is a way for students to practice developing their problem-solving skills.

13 Claims, 35 Drawing Sheets

Step #4 once the second receptacle is filled it will be moved to the hundreds group.

Example: What is 15 + 17=?

Student will be instructed to show 15 counting cubes separately and 17 counting cubes separately.

Student will be instructed to show groupings using receptacles.

Step #1 will be to group the ones into tens utilizing the third receptacles.

Step #2 once tens grouping is complete third receptacles are moved to the tens group.

Once Students have grouped the counting cubes, they will be able to answer the question.

What is the answer to 15 + 17 =?

The answer is 32, with three tens, two ones.

Students are asked to solve an example.

What is 55 + 57=?

Student will be instructed to show 55 counting cubes separately and 57 counting cubes separately.

Student will be instructed to show groupings using receptacles.

Step #1 will be to grouping of ones into tens utilizing the third receptacles.

Step #2 once the tens grouping is completed third receptacles will be moved to the tens group.

Step #3 now the second receptacle will be filled with the third receptcles.

Step #4 once the second receptacle is filled it will be moved to the hundreds group.

Once Students have grouped the counting cubes, they will be able to answer the question.

What is the answer to 55 + 57 =?

The answer is 112, with one hundreds, one tens, two ones.

Students will be asked to solve an example.

What is 555 + 557=?

Student will be instructed to show 555 counting cubes separately and 557 counting cubes separately.

Student will be instructed to show groupings using receptacles.

Step #1 will be to group the ones into tens utilizing the third receptacle.

Step #2 once the tens grouping is completed third receptacles will be moved to the tens group.

Step #3 now the second receptacle will be filled with the third receptacles.

Step #4 once the second receptacle is filled it will be moved to the hundreds group.

Step #5 once the second receptacles are filled, they will be moved to the thousands group and placed within the first receptacle.

Once Students have grouped the counting cubes, they will be able to answer the question.

What is the answer to 555 + 557 =?

The answer is 1112, with one thousands, one hundreds, one tens, two ones.

3D REGROUPING FOR HANDS ON LEARNING

RELATED APPLICATIONS

The present application claims the benefit of U.S. Provisional Patent Application No. 63/123,496 filed on Dec. 10, 2020, which is hereby incorporated by reference in its entirety.

BACKGROUND

Field of the Invention

The invention described herein relates to teaching aids for mathematics.

Background of the Invention

There are traditional methods in teaching primary school mathematics in a base ten system, however these methods may not effectively provide a stimulating concrete experience that is also simple and engaging for students in learning mathematical concepts. In order to provide such experiences, firsthand interaction with manipulatives provide conceptual mathematical ideas that give students a tactile and visual model in developing their understanding.

SUMMARY OF THE INVENTION

A primary aim of the present invention is to provide a manipulative tool that will help teachers to teach students by engaging them physically and visually in understating a process of making groups of tens when carrying out operations forward (addition) and borrowing (subtraction) with two-digit numbers or larger. When utilizing typical manipulative techniques, the explaining process frequently is so complicated that students get lost and may not remember the process the next time they are asked to recall the information.

The 3D Regrouping Boxes of the present invention may be summarized as including three different sized receptacles that stack within one another to allow students to move cubes to indicate mathematical functions and their interrelations, allowing a student to actually handle and visualize each operation.

The current invention is comprised of a total of six different receptacles. The first, second, fourth, and fifth receptacles are quadrilateral shape being of a cubic form with four sides or edges and four vertices or corners with interior angles that add up to 360 degrees, where all sides and angles are equal. The third and sixth receptacles are of a parallelogram form being of rectangular form, where opposite sides or edges are parallel and of equal length and four vertices or corners with an interior angle of ninety degrees each.

The 3D Regrouping Boxes is a manipulative tool where counting cubes are utilized within the receptacles. The first, second, and third receptacles each hold respectively counting cubes from up to one thousand, one hundred, and ten. The first receptacle holds up to one thousand counting cubes in increments (or groups) of one hundred. The second receptacle holds up to one hundred counting cubes in increments of ten. The third receptacle holds up to ten counting cubes in increments of one.

The initial receptacles (first, second, and third receptacles) each have a corresponding receptacle which is a cap or cover. Once an initial receptacle is filled with counting cubes, then the initial receptacle is topped with a corresponding receptacle cap or cover (respectively fourth, fifth, and sixth receptacles) to show that the initial receptacle is filled with the maximum counting cubes for that initial receptacle. The receptacles may be made of a sturdy material such as various plastics, metal, cardboard, shaped foam sheets, wood, or any suitable material.

The 3D Regrouping Cube is arranged so that the breakdown of the counting cubes are easily discernable into group of ten. For example, the third receptacle can be filled with a maximum of ten counting cubes. Once the ten counting cubes fill the third receptacle, it is covered or topped with the corresponding receptacle cover to indicate a complete group of ten. Analogously, the second receptacle corresponds to one hundred counting cubes and is filled by ten groups of ten, i.e., ten filled third receptacles. Likewise, for the first receptacle corresponding to one thousand counting cubes filled by ten groups of one hundred. The counting cubes that are to be utilized are common products already available in the market; the 3D Regrouping boxes will be manufactured to accommodate the desired counting cubes.

The initial receptacles are nestled within one another. For example, the third receptacle is inserted at a position within the second receptacle; with the second receptacle positioned within the first receptacle. The initial receptacles can be either nestled with or without the corresponding cap or cover once that receptacle is filled.

In one example, when adding ninety to twelve, an initial set of counting cubes corresponding to ten would fill one of the third receptacles leaving two counting cubes out. Then the third receptacle would be inserted into the second receptacle to indicate a complete group of ten tens, a total of one hundred counting cubes.

In one example, when adding ninety to twelve, an initial set of counting cubes corresponding to ten would fill one of the third receptacles leaving two counting cubes out. Then the third receptacle would be inserted into the second receptacle to indicate a complete group of ten tens, a total of one hundred counting cubes.

For example:

90+12

90+10+2 [nine base ten added to one base ten and two counting cubes]

(90+10)=100 [the base ten are grouped together]

100+2=102 [the grouped base ten are added to the two counting cubes]

The second receptacle is not limited to accommodating only one of the third receptacle but can hold multiple third receptacles. To further a student's understanding that a regrouping is complete the corresponding cover is capped over the filled receptacle. By capping, this indicates to the teacher and student that there is a completed base ten problem.

On the other hand, if we were to borrow eight from one hundred, then the third receptacle would be disengaged from the second receptacle.

For example:

100−8 [the one hundred will be broken down to ten base ten]

100=90+10 [ten base ten are broken down to nine base tens and one base ten, the nine base ten will be pushed aside to be incorporated at the end]

(10−8)=2 [one base ten is broken down to eliminate eight counting cubes, the corresponding cap to the third receptacle would be removed to indicate that the base ten is not complete]

90+(10–8=2)=92 [there is nine base ten available with two counting cubes from the elimination of eight counting cubes from a base ten]

Furthermore, here is an example utilizing the first receptacle accommodating one thousand counting cubes corresponding with ten of the second receptacle or one hundred of the third receptacles.

Such as:

1000–128 [1000 will be broken down to ten second receptacles]

We will need to borrow (subtract) from the second receptacles 128, by breaking down two second receptacles.

1000=800+200 [200 will be broken down to two second receptacles, leaving eight second receptacles to be pushed to the side to be incorporated at the end]

200–128 (the two second receptacles are broken down to eliminate 100 counting cubes and 28 counting cubes, taking away one second reciprocal entirely and eliminating 28 counting cubes from the one second reciprocal)

100–28 [there is ten base ten, in which two base ten are taken away entirely with a third base ten broken down to eliminate eight counting cubes leaving two counting cubes]

Now the regrouping of 800+70+2=872

BRIEF DESCRIPTION OF FIGURES

Various other objects, features and advantages of the present invention will become fully appreciated as the same becomes better understood when considered in conjunction with the accompanying drawings. To summarize the drawings.

DESCRIPTION OF THE PREFERRED EMBODIMENT

The illustrative embodiments of the present invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number, respectively. More than one term may be interchangeable, particularly the terms "wall" and "facet".

The 3D mathematical tool presented utilizes three different shaped receptacles to facilitate an understanding of arithmetic regrouping. Referring to the figures, the receptacles are comprised of a first receptacle 100, second receptacle 200, and third receptacle 300. In which the receptacles 100/200/300 utilize counting cubes (not shown). The third receptacle 300 can be engaged within either the second receptacle 200 or the first receptacle 100, whereas the second receptacle engages within the first receptacle 100.

Figure 1A:
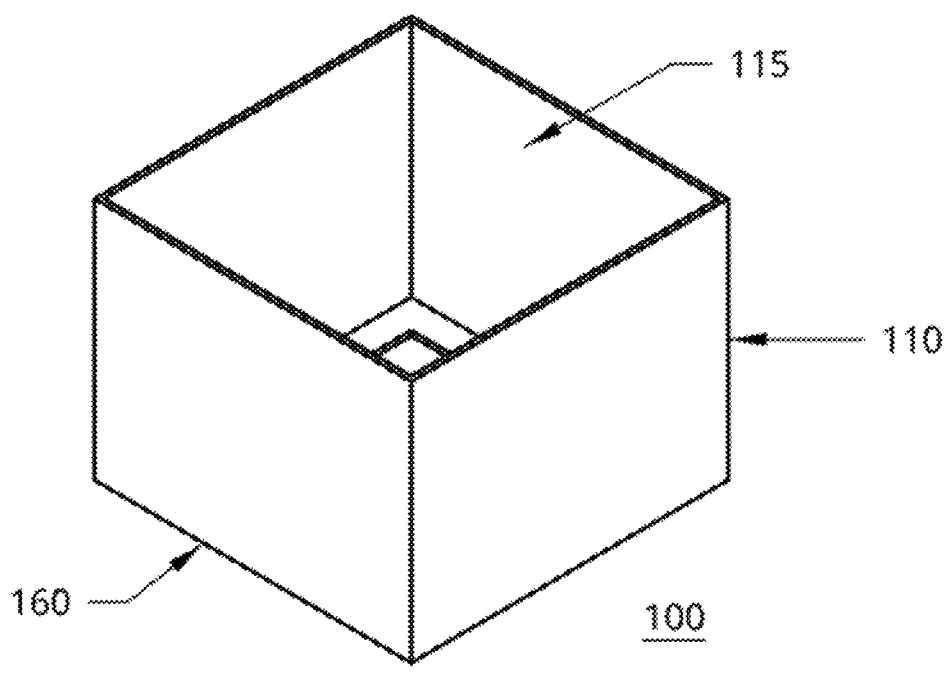
FIGS. 1a, 1b, 1c, 1d, 1e, and 1f illustrate various views of the first receptacle according to an embodiment of the present invention.
Figure 1B:
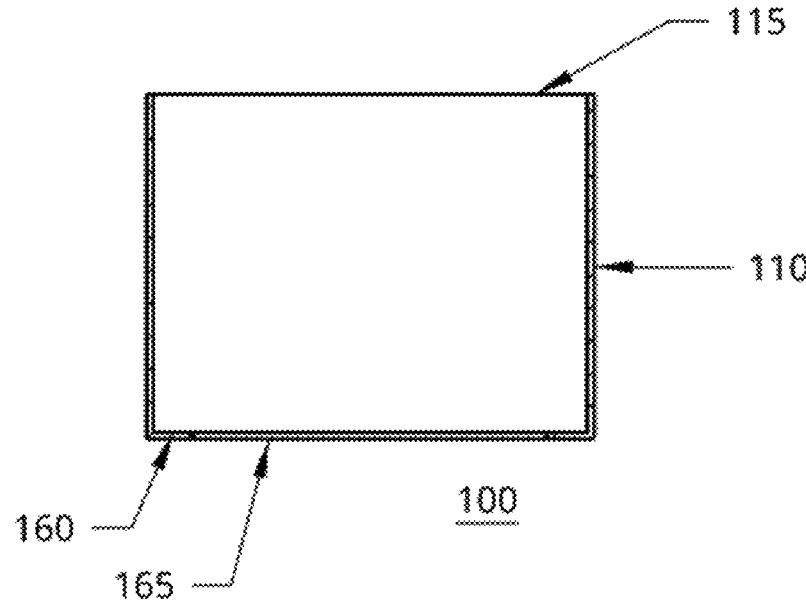

FIG. 1a and FIG. 1b show a plan view of a first receptacle 100 being a three-dimensional cubic shape that is bounded by six square facets/walls, with three facets meeting at each vertex, twelve edges, and eight vertices. One square facet/wall is an open side that is unobstructed surrounded by a perimeter of four obstructed square planar facets/walls 110. A sixth side that is partially obstructed square facet/wall (referred also as a base end) 160 opposite the open side of the unobstructed square facet 115. The first receptacle 100 is able to hold exactly one thousand counting cubes (not shown). The unit size of each counting cube is 1×1×1, with the first receptacle 100 being a unit size of 10×10×10 in comparison to the counting cube. Additionally, the first receptacle 100 is able to hold ten second receptacles 200, one hundred third receptacles 300 and or a combination of counting cubes (not shown) and receptacles 200/300.

FIG. 1b shows a cutaway view for first receptacle 100, having an inner void surrounded by one or more side facets/walls 110 with one or more outer flat surface. The first receptacle 100 has one open side that is an unobstructed open facet 115 that is bordered by side walls 110. The first receptacle 100 has one partially closed facet 160 with an inner extending perimeter ledge that surrounds an inner void 165 of the partially obstructed (closed) side 160 that is opposite of the unobstructed (open) side 115 with the inner extending perimeter configured to be a ledge in which either counting cubes or alternate receptacles (second and or third receptacles) 200/300 are secured within the first receptacle 100.

Figure 1C:
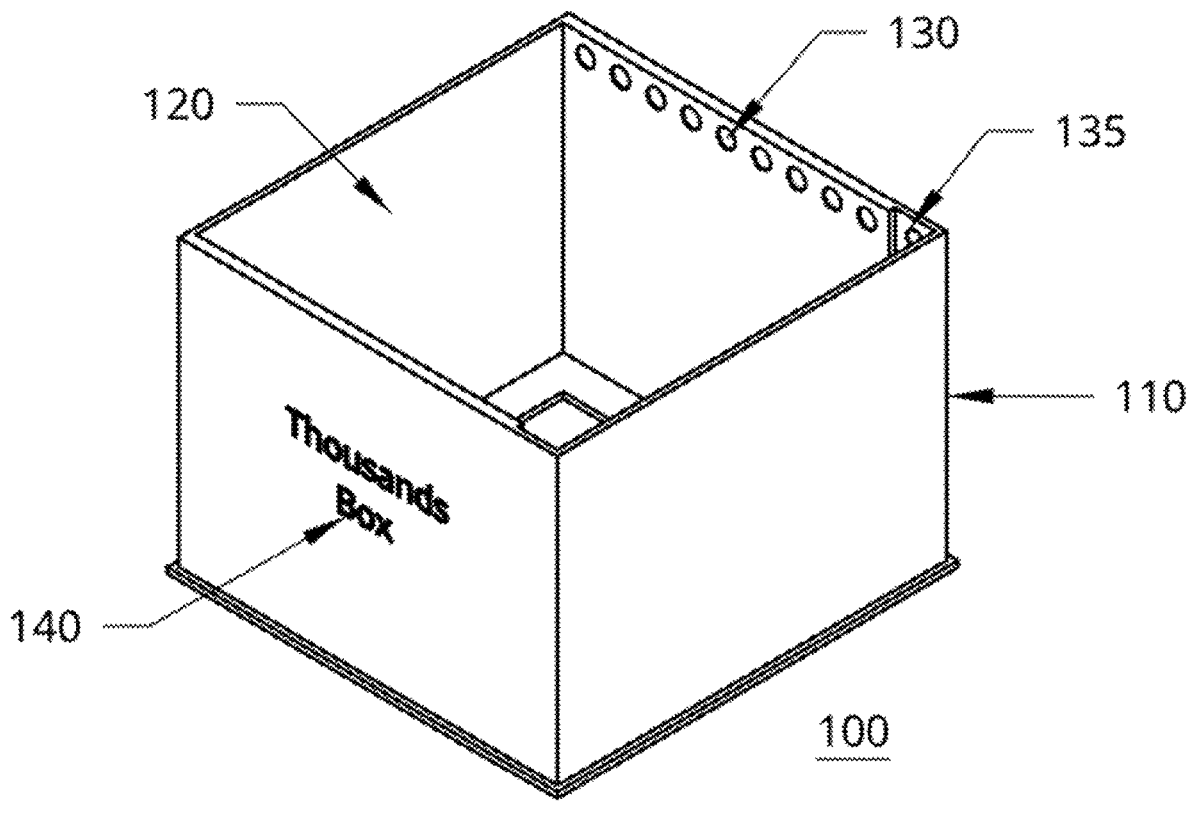
Figure 1D:
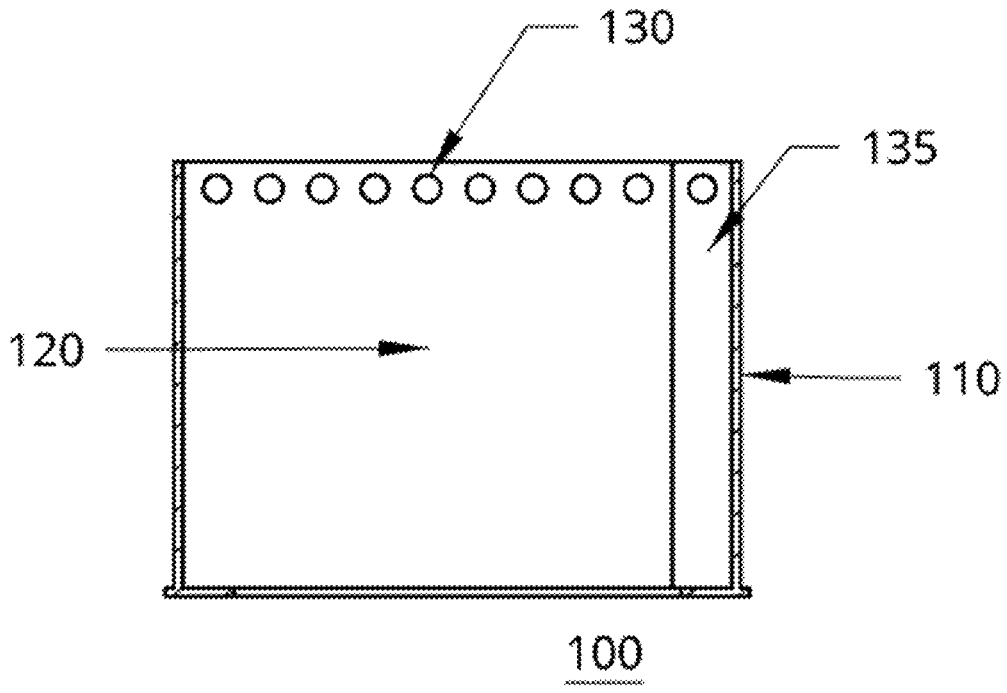
Figure 1E:
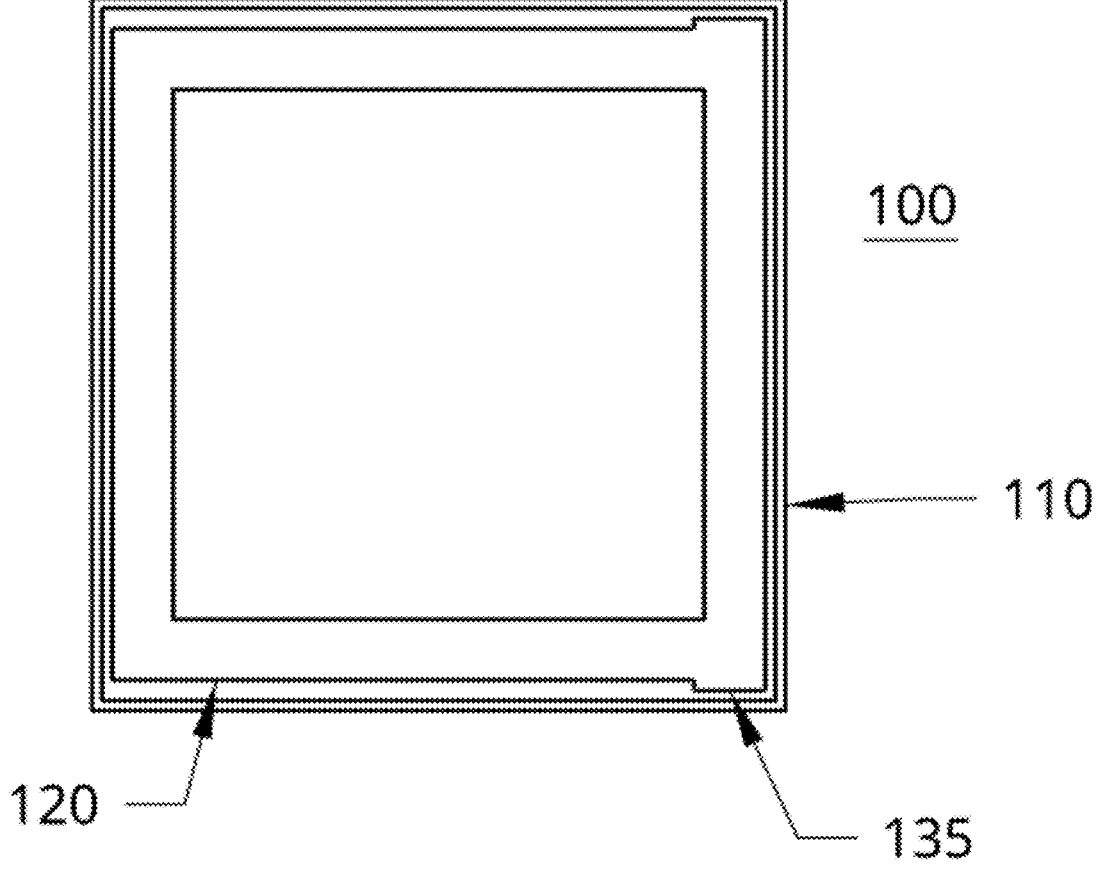
Figure 1F:
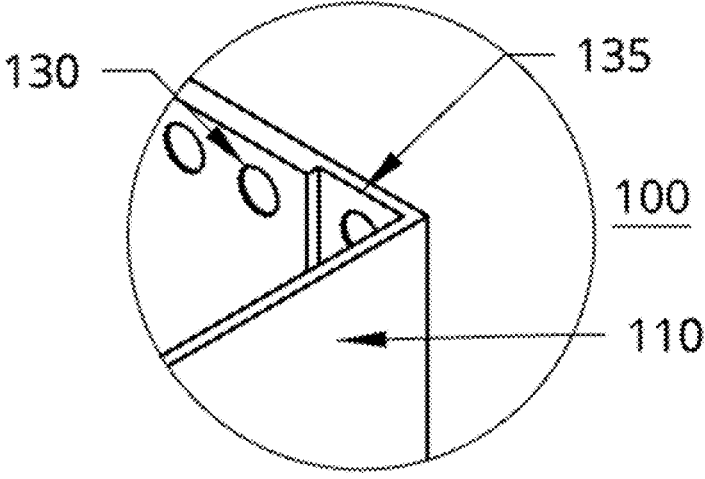

FIGS. 1c, 1d, 1e, and 1f, show an alternate view of the first receptacle 100 having one to ten channels 135 formed in an inner surface 120 of one or more said side wall(s) 110 with a vertical length ten-unit size of counting cubes (not shown). The formed channel(s) 135 can be placed at various positions within the inner surface 120, either at an end point of a side wall or along any preferred position for placing counting cubes or an alternate receptacle (second or third receptacles) 200/300. FIG. 1e shows two parallel channels 135 at an inner perimeter 120 of the obstructed side walls 110, where indentations are formed along the upper portions of the inner perimeter of the first receptacle 100. The indentations 130 may take the form of a term, shape, or numeral, for example. FIG. 1d shows a cutaway view of the channels 135 formed from the top of the first receptacle at the unobstructed facet extending down to the partially obstructed base end 160. FIG. 1c shows on an outer periphery face 110 of the first receptacle 100 having an overlay 140 with either a desired, numeral, term, or design.

Figure 2A:
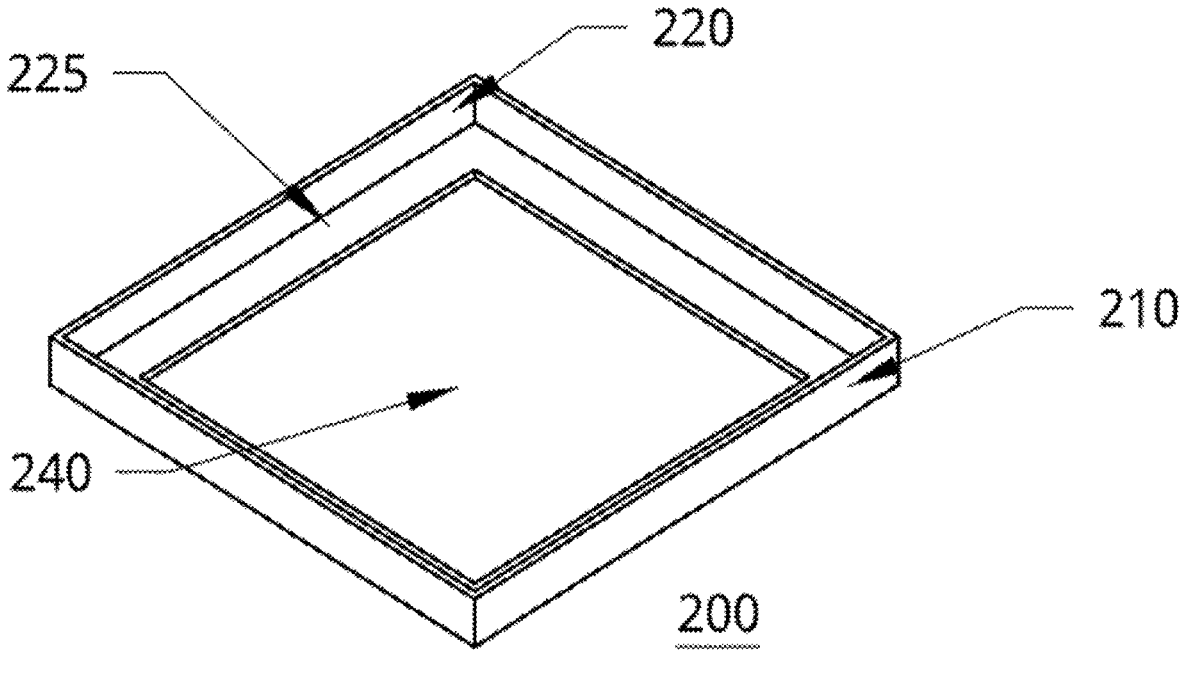
FIGS. 2a, 2b, 2c, 2d, 2e, 2f, and 2g illustrate various views of the second receptacle according to an embodiment of the present invention.
Figure 2B:
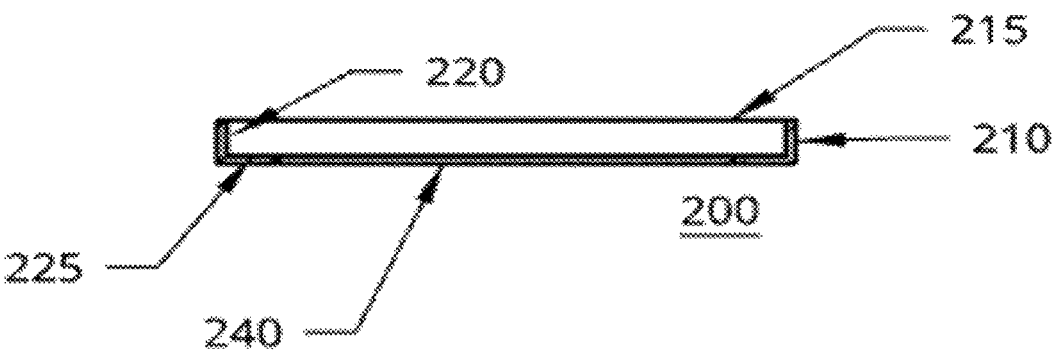

FIGS. 2a-2b show a plan view of a second receptacle 200 being of a three-dimensional quadrilateral bounded by six facets, three facets meeting at each vertex, eight edges, eight vertices, and all parallel sides or facets equal in size to one another. One square facet is an open unobstructed side 215 surrounded by a perimeter of four obstructed (closed) rect-
angular planar facets 210. Opposite of an unobstructed open
side 215, a sixth partially closed/obstructed facet 225 has an
inner extending perimeter ledge(s) that surrounds an inner
void 240. The extending ledge(s) has a length ten-unit sizes
of a counting cube and a height equal to one unit size of a
counting cube. FIG. 2a further illustrates the second recep-
tacle 200 having an area measuring one-hundred-unit sizes
of a counting cube, i.e., 10×10.

Figure 2C:
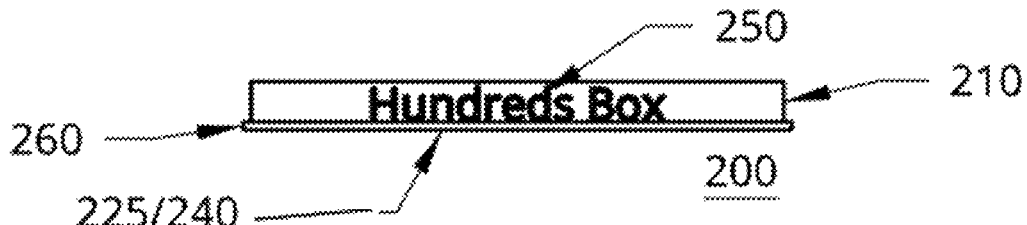
Figure 2D:
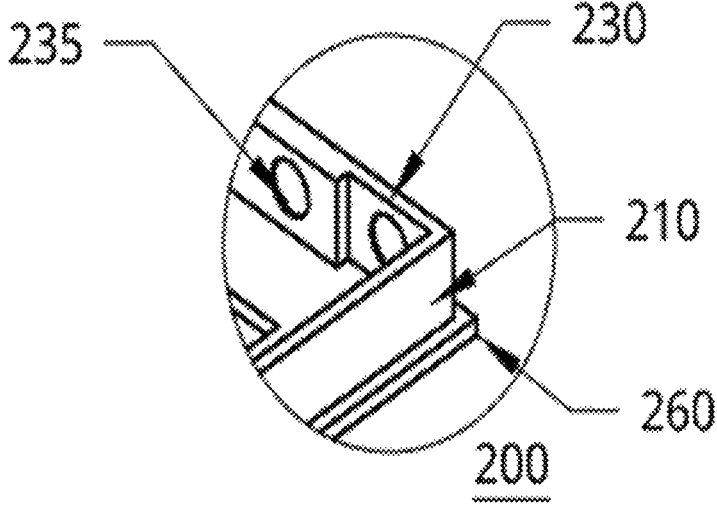
Figure 2E:
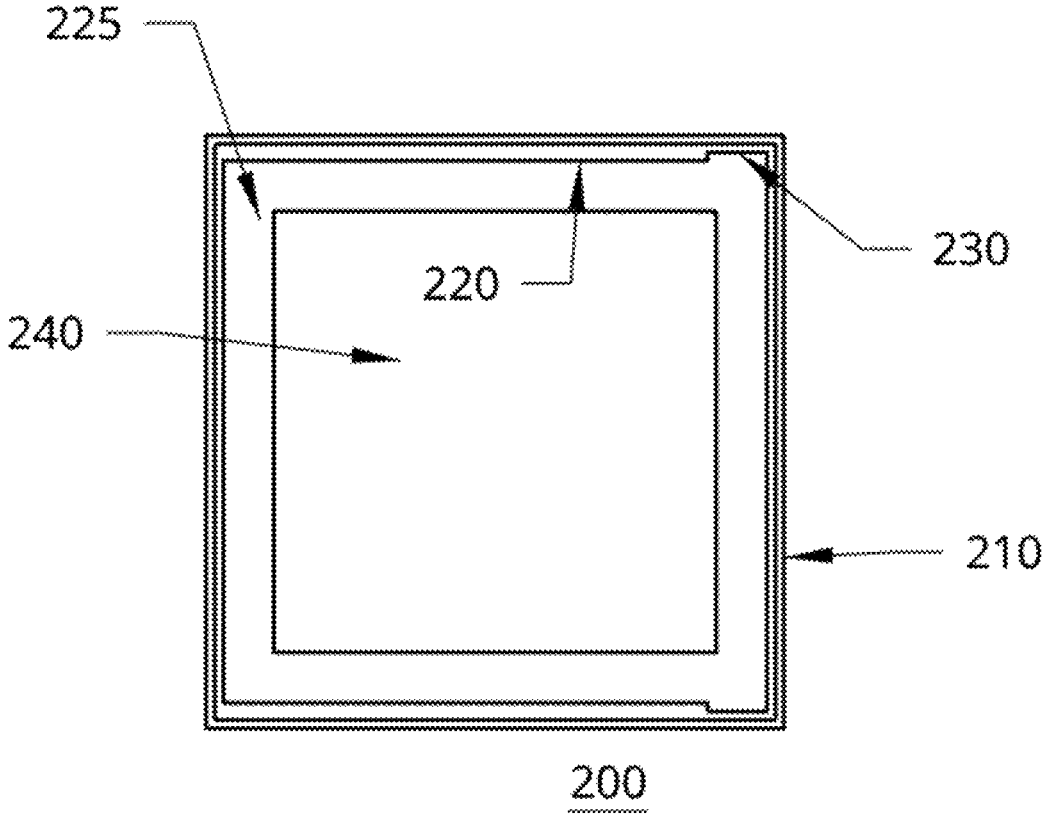
Figure 2F:
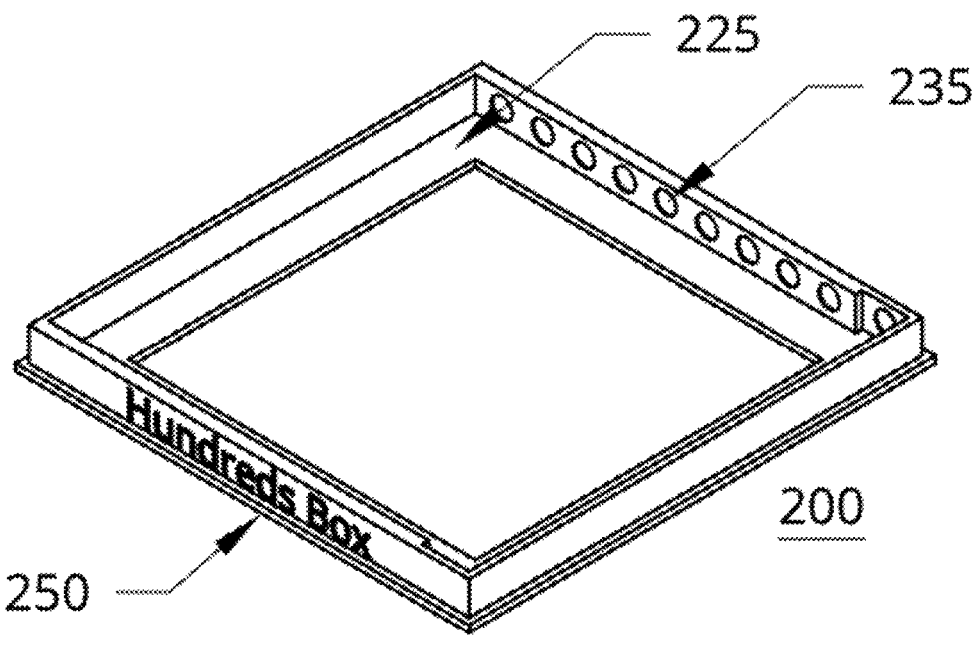
Figure 2G:
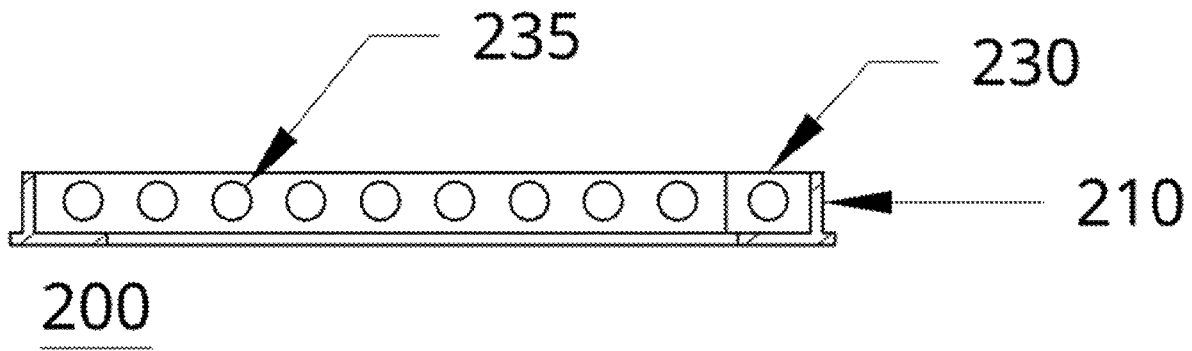

FIGS. 2c-2d illustrate the second receptacle 200 having
an outer perimeter edge 260 extending around the outer
surface of the partially obstructed side 225/240, in which the
outer perimeter edge 260 engages with the channels of 135
of the first receptacle 100. FIGS. 2d-2g show the second
receptacle 200 with parallel channels 230 formed in an inner
surface 220 of one or more side wall(s) 210 having a
horizontal length of ten-unit size counting cubes. The figures
further show opposite parallel facets/walls having corre-
sponding parallel indentations 235 consisting of either a
term, shape, or numeral, in which the indentations 235 are
arranged along the inner surface perimeter 220 of the second
receptacle 200. An overlay 250 is on an outer periphery face
of the second receptacle 200 being either a desired numeral,
term, or design.

Figure 3A:
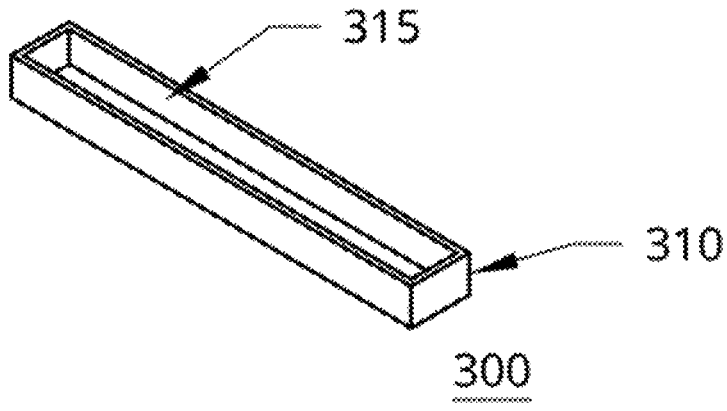
FIGS. 3a, 3b, 3c, 3d, and 3e illustrate various views of the third receptacle according to an embodiment of the present invention.
Figure 3B:
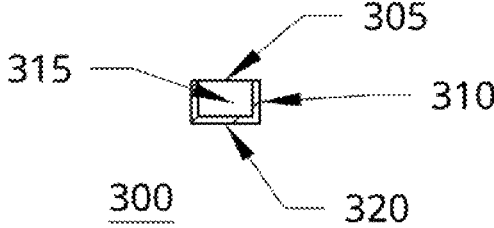
Figure 3C:
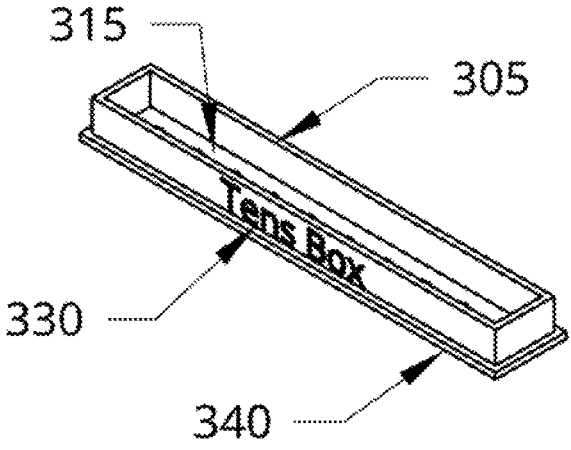
Figure 3D:
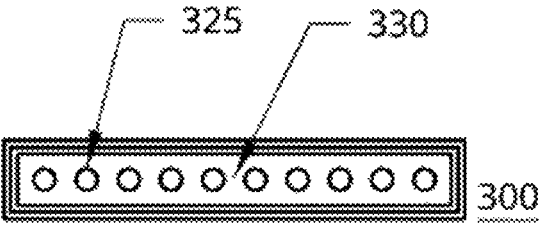
Figure 3E:
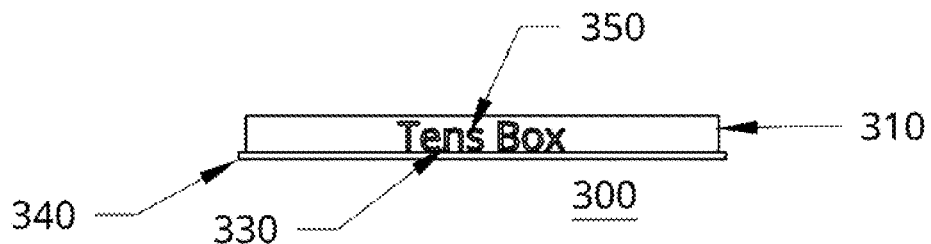

FIGS. 3a-3b illustrate a third receptacle 300 that is
parallelogram being a rectangular form, having a channel
315 with one unobstructed open facet 305 and an opposite
obstructed facet 320 being a base, two or more raised side
walls 310 being of a height equal to one unit size counting
cube with a length equal to ten-unit size counting cubes
forming a channel 315 with a void within the parallelogram.
FIG. 3c further illustrates an outer perimeter edge 340
around the base 330, in which the outer perimeter edge 340
engages with the first or second receptacle 100/200 either by
inserting, snapping, resting, or sliding into a corresponding
channel 135/230. FIG. 3d illustrates in the third receptacle
300 indentations 325 formed on the inner surface of the base
330 a form of either a term, shape, or numeral. FIG. 3e
shows on an outer periphery face of the first receptacle 300
having an overlay 350 with a desired numeral, term, or
design.

Figure 4A:
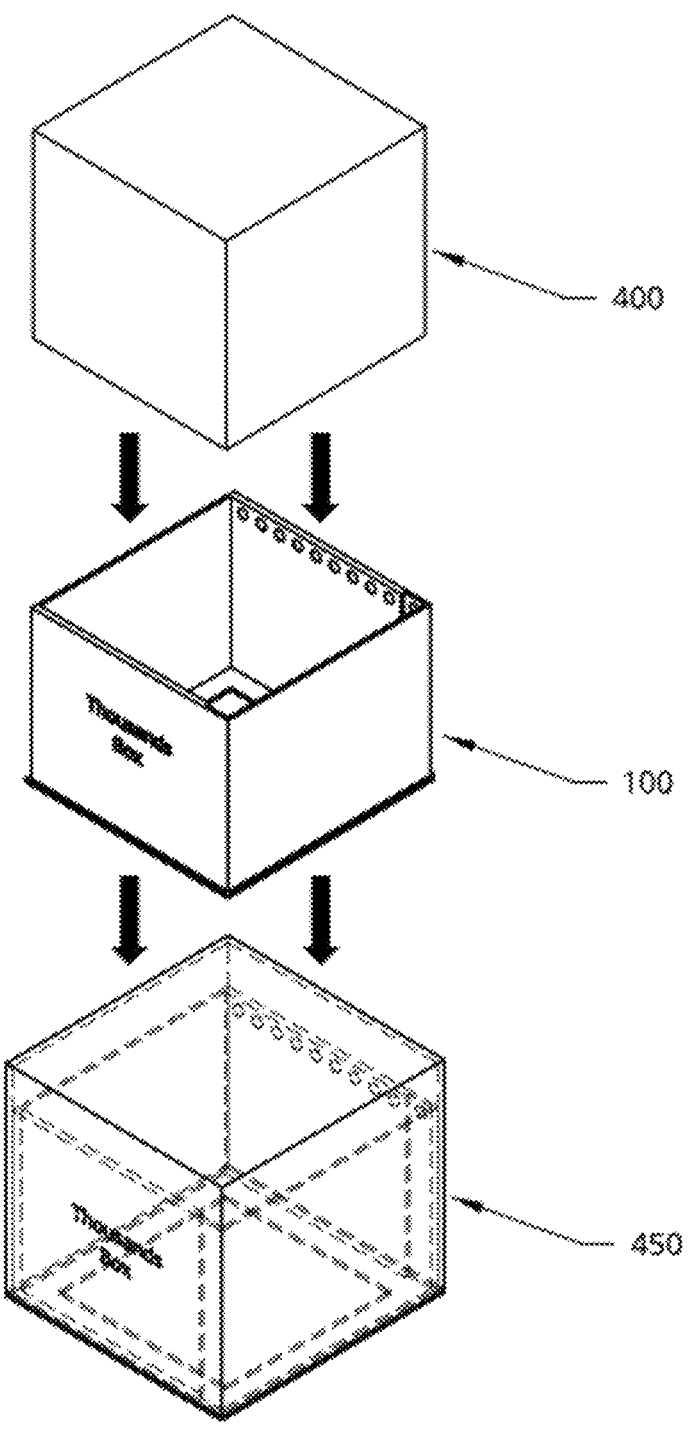
FIG. 4a illustrates a perspective view of a fourth receptacle with a first receptacle, according to an embodiment.

FIG. 4a illustrates a fourth receptacle 400 that is a
cover/cap that is placed over the first receptacle 100, to
indicate that the first receptacle 100 is filled with the proper
number of counting cubes or alternate receptacles 200/300
(not shown). The fourth receptacle 400 is a cubic form
having one obstructed facet with a parallel unobstructed
facet in which an inner void engages with the first receptacle
100. The cover/cap 400 has an optional outer overlay (not
shown) with either a numeral, term, or design could be
added. Once the first receptacle 100 is filled with the proper
corresponding number of counting cubes, and the fourth
receptacle 400 is placed upon the first receptacle 100 this
will indicate as being tallied 450.

Figure 4B:
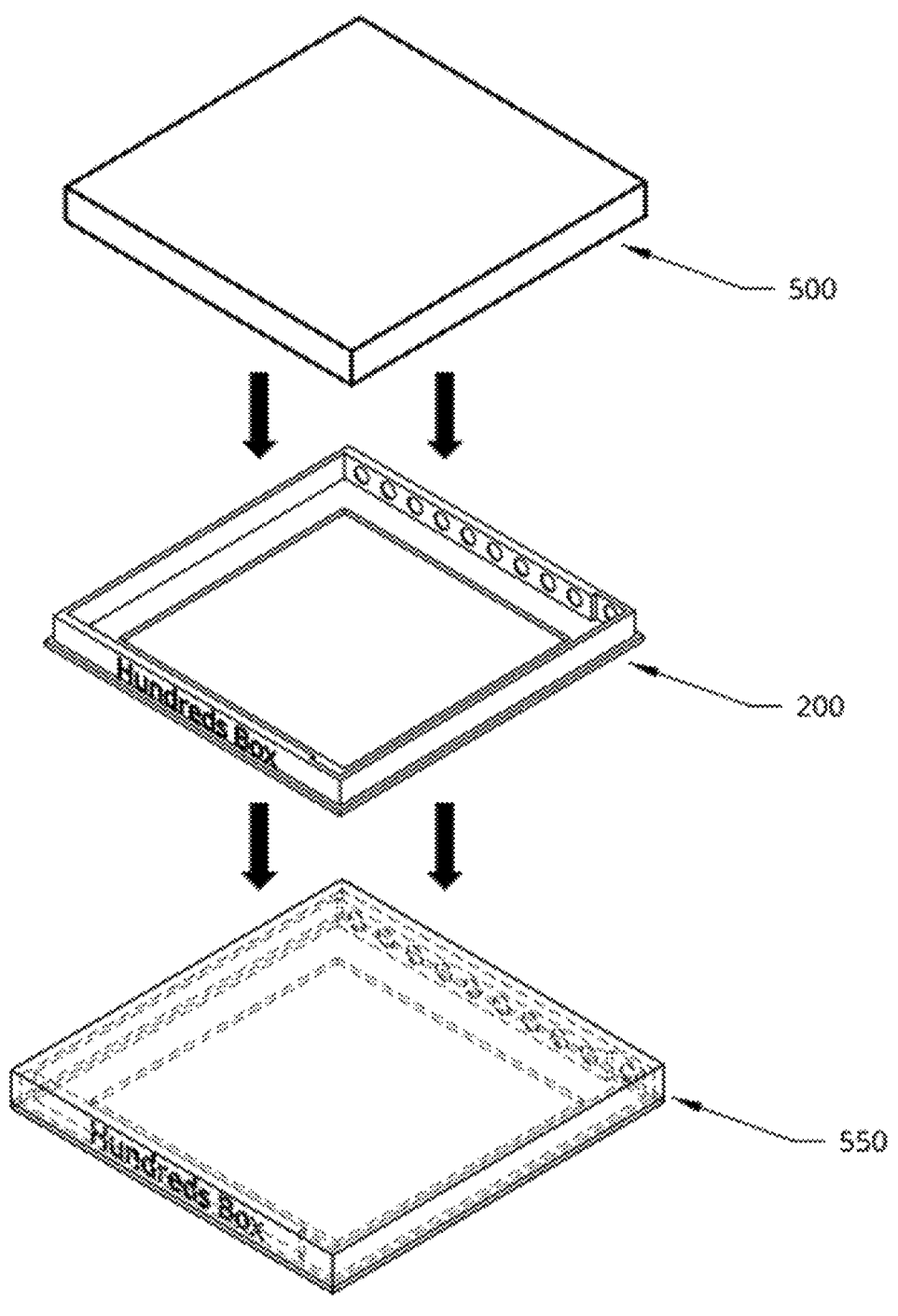
FIG. 4b illustrates a perspective view of a fifth receptacle with a second receptacle, according to an embodiment.

FIG. 4b illustrates a fifth receptacle 500 that is a cover/cap
that is placed over the first receptacle 100, to indicate that the
second receptacle 200 is filled with the proper number of
counting cubes or third receptacles 300 (not shown). The
fifth receptacle 500 is a cubic form having one obstructed
facet (closed side) with a parallel unobstructed facet (open
side) in which an inner void engages with the second
receptacle 200. An outer overlay (not shown) with either a
numeral, term, or design could be added. Once the second
receptacle 200 is filled with the proper corresponding num-
ber of counting cubes, and the fifth receptacle 500 is placed
upon the second receptacle 200 this will indicate as being
tallied 550.

Figure 4C:
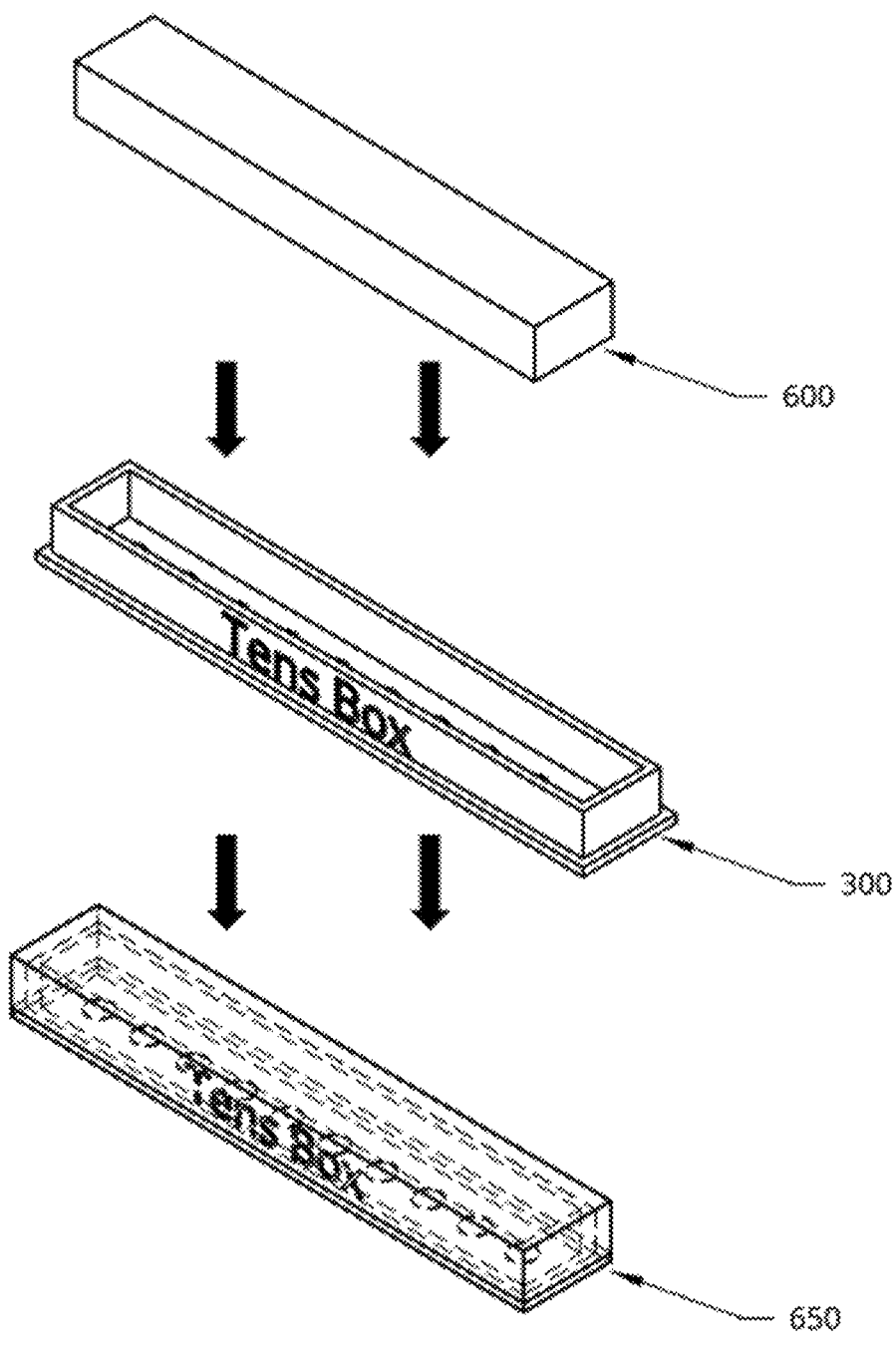
FIG. 4c illustrates a perspective view of a sixth receptacle with a third receptacle, according to an embodiment.

FIG. 4c illustrates a sixth receptacle 600 that is a cover/
cap that is placed over the third receptacle 300, to indicate
that the third receptacle 300 is filled with the proper number
of counting cubes. The sixth receptacle 600 is rectangular
form having one obstructed facet (closed side) with a
parallel unobstructed facet (open side) in which an inner
void accommodates the third receptacle 300. An outer
overlay (not shown) with either a numeral, term, or design
could be added. Once the third receptacle 300 is filled with
the proper corresponding number of counting cubes, and the
sixth receptacle 600 is placed upon the third receptacle 300
this will indicate as being tallied 650.

Figure 5A:
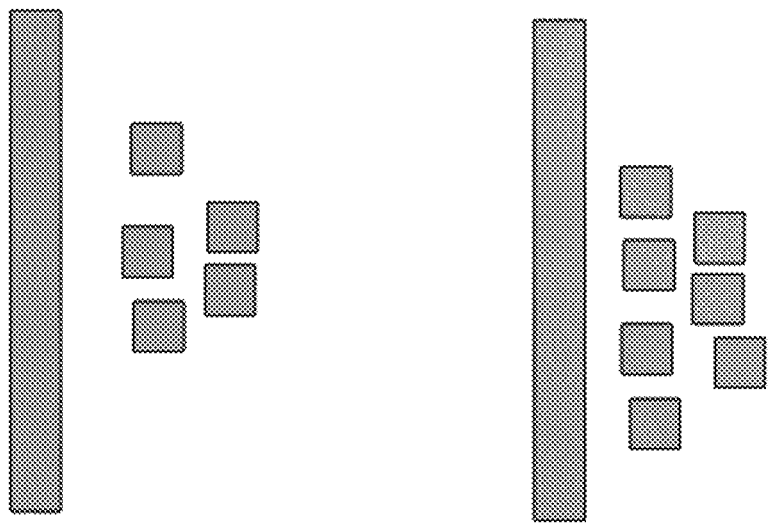
FIGS. 5a-5e, 6a-6g, 7a-7h respectively illustrate various methods sequentially to demonstrate the use of the regrouping boxes, according to an embodiment.
Figure 5B:
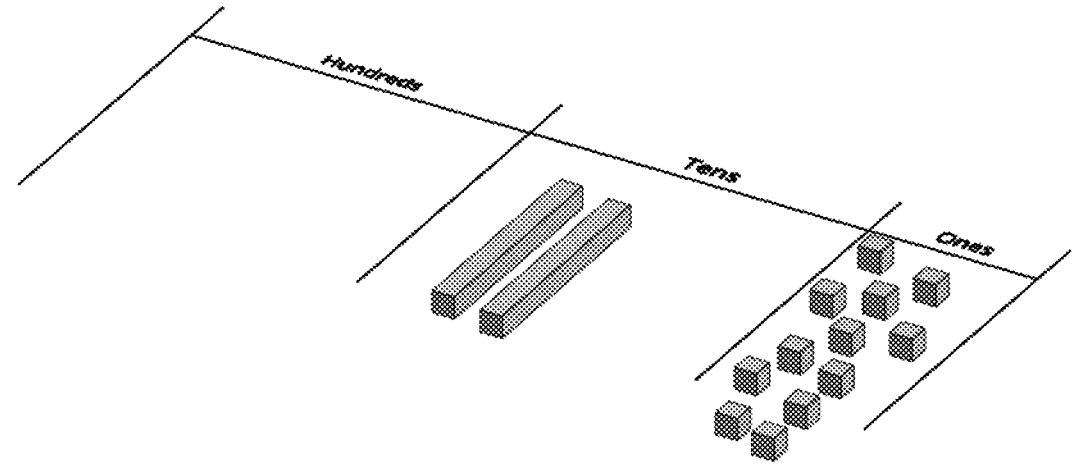
Figure 5C:
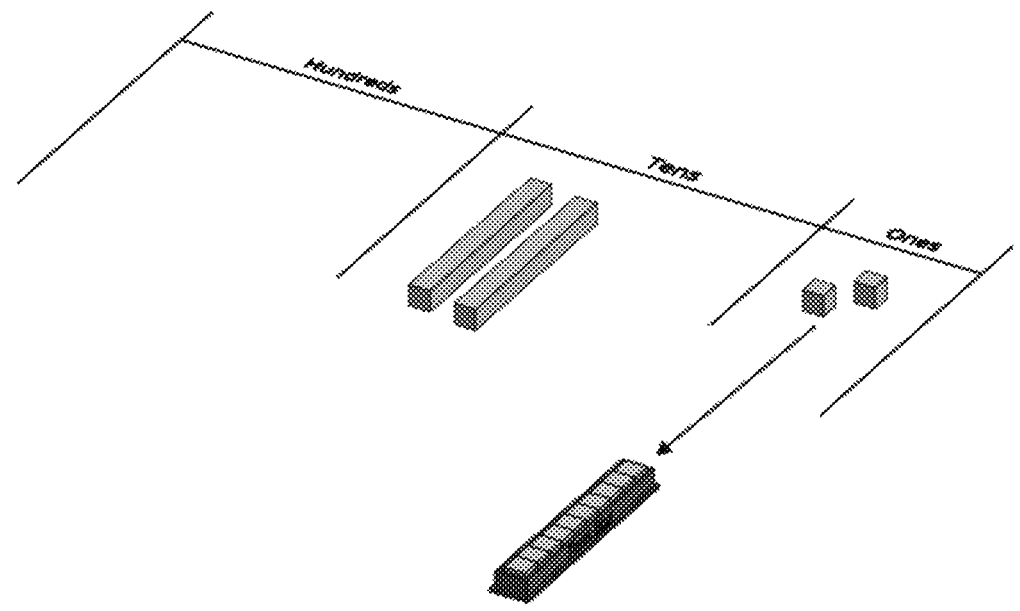
Figure 5D:
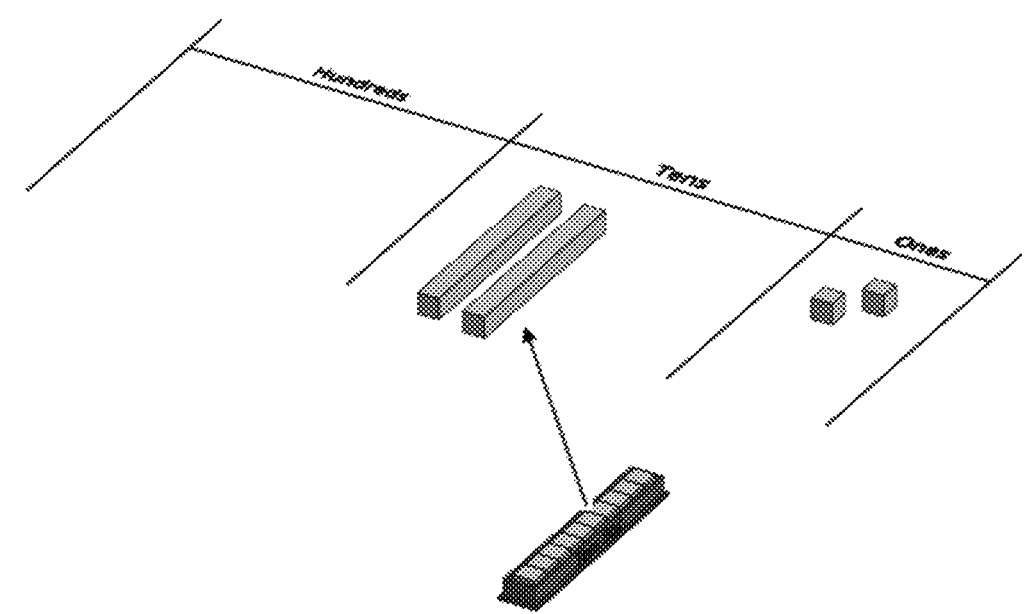
Figure 5E:
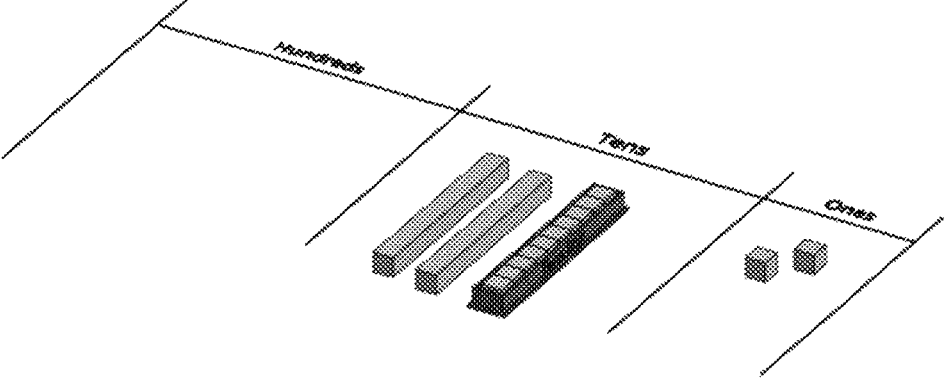

FIGS. 5a-5e, FIGS. 6a-6g, and FIGS. 7a-7h illustrate the
utilization of the 3D Regrouping Boxes. FIGS. 5a-5e, dem-
onstrates an example using the third receptacle to determine
the sum of fifteen plus seventeen. FIGS. 5a-5c, illustrates
base ten counting cubes, with two units of ten and twelve
units of one. FIG. 5d goes on to illustrate utilizing the third
receptacle, filling it with the single unit counting cubes.
Once the third receptacle is filled it is grouped with the two
ten units as in FIG. 5e to indicate the sum of fifteen plus
seventeen is thirty-two.

Figure 6A:
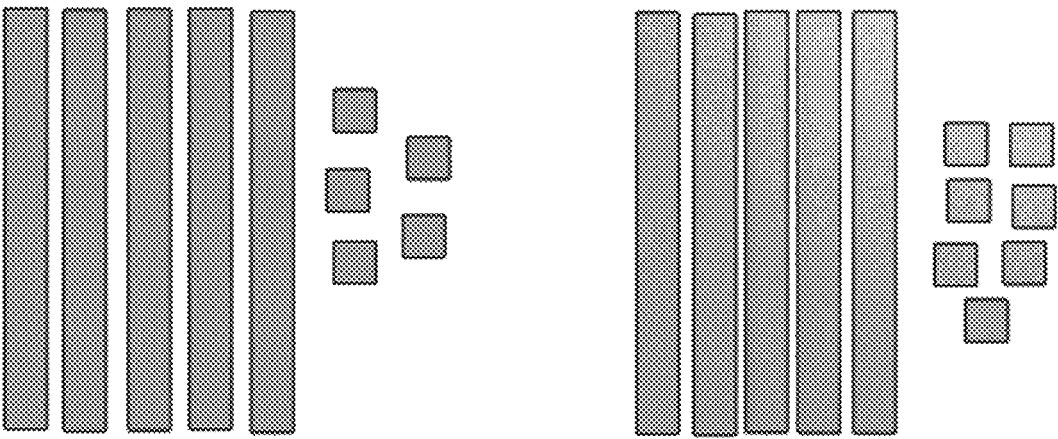
Figure 6B:
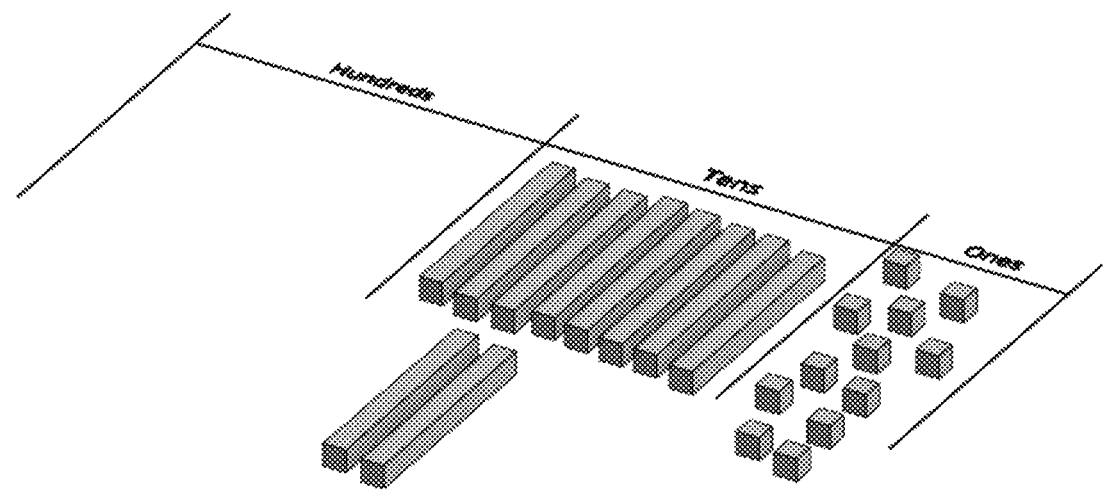
Figure 6C:
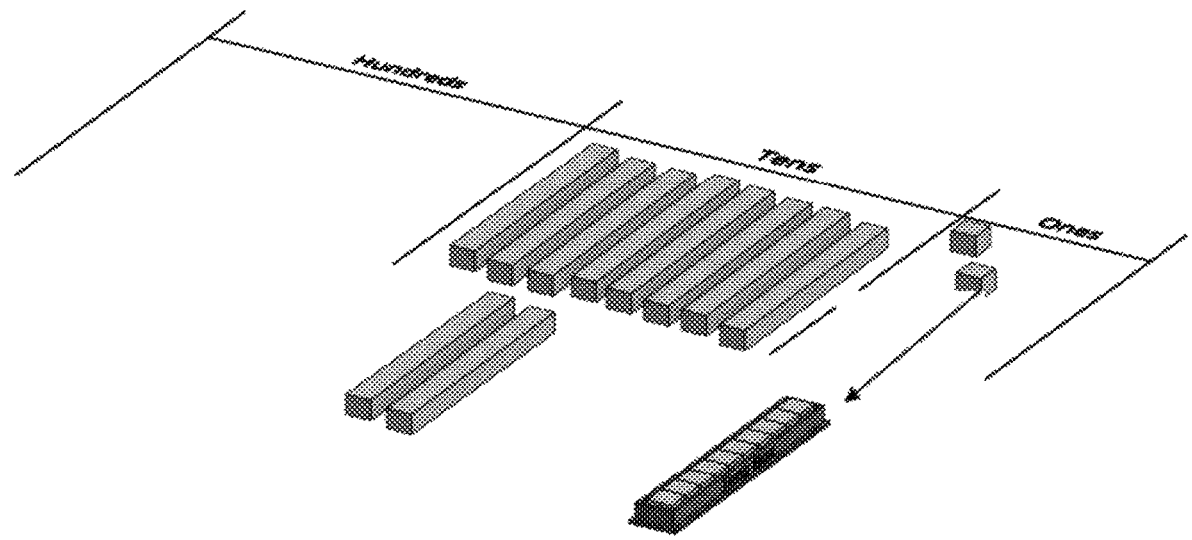
Figure 6D:
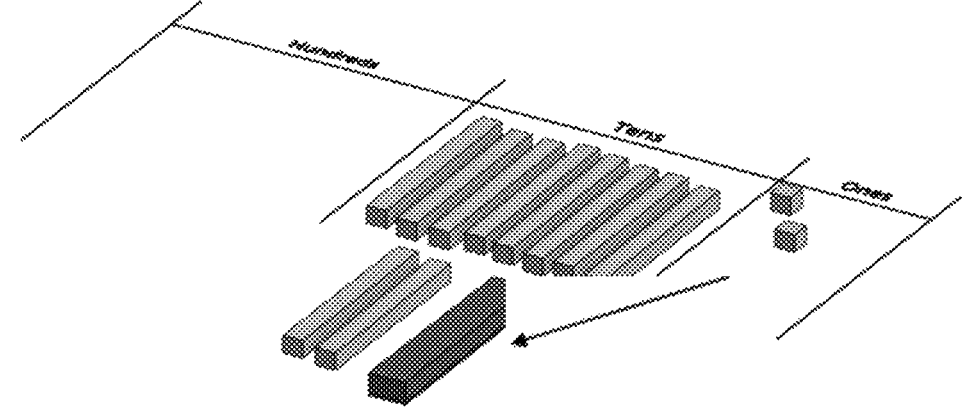
Figure 6E:
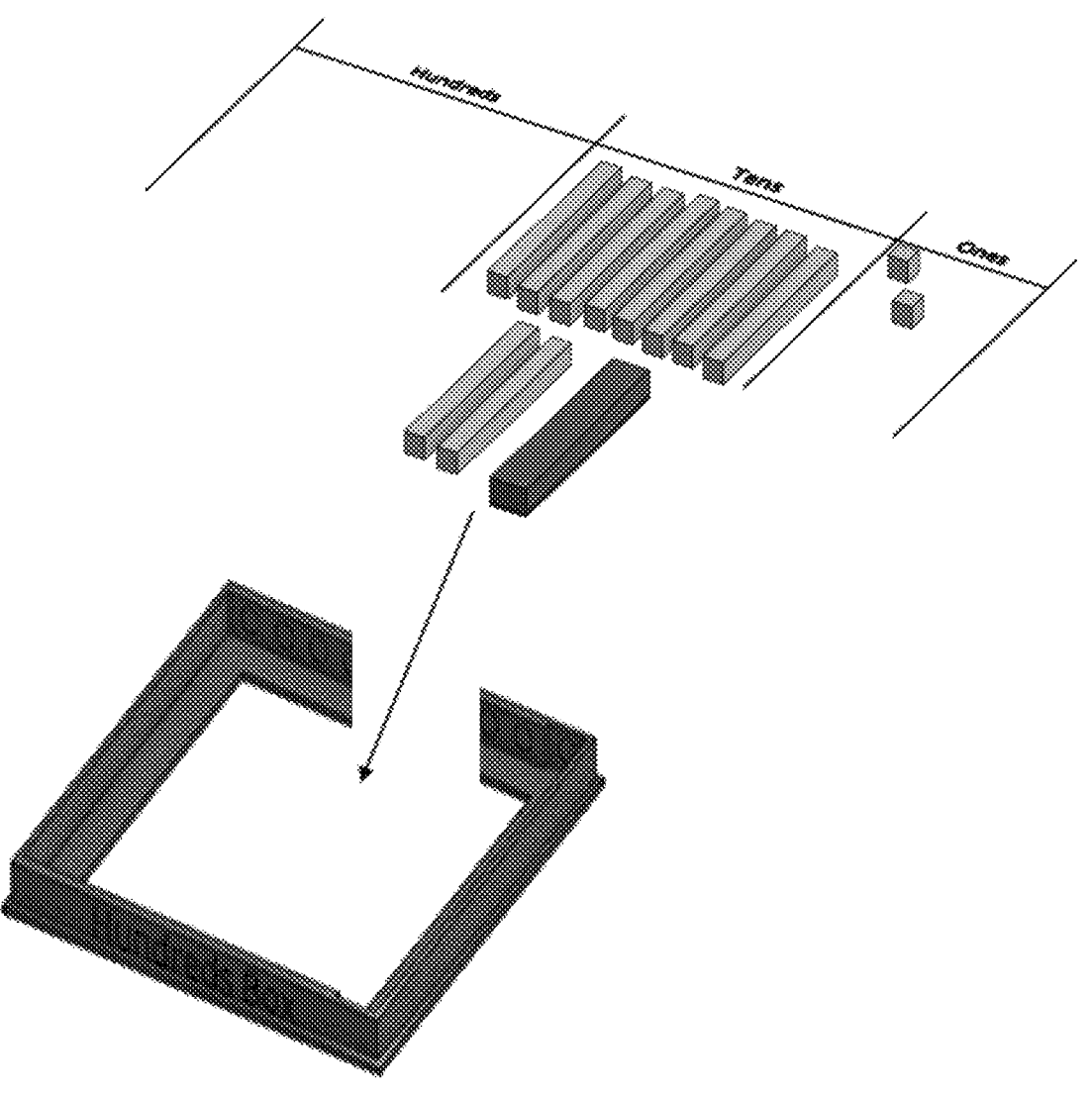
Figure 6F:
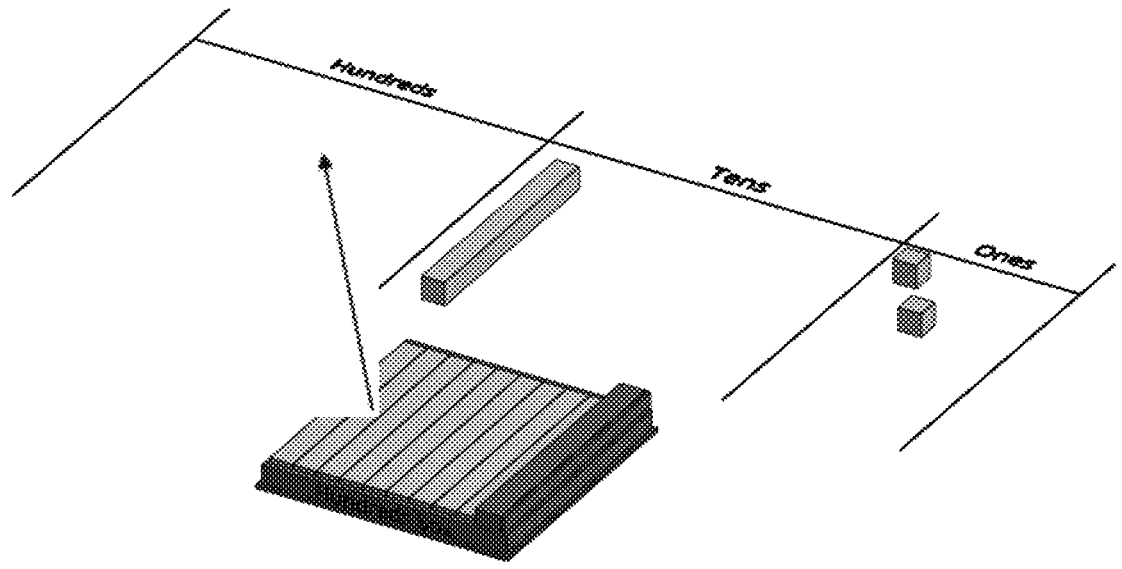
Figure 6G:
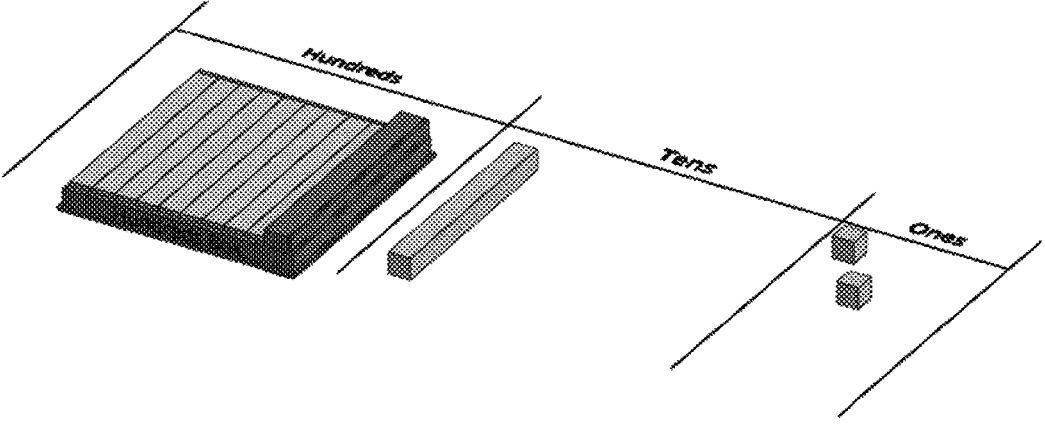

FIGS. 6a-6g further illustrate the utilization of the 3D
Regrouping Boxes to demonstrate an example using the
second and third receptacle to determine the sum of fifty-five
plus fifty-seven. FIG. 6a-6d, illustrates base ten counting
cubes, with ten units of ten and twelve units of ones. FIGS.
6c-6e, goes on to illustrate utilizing the third receptacle, with
step #1 &step #2 the third receptacle is filled with the single
unit counting cubes. Once the third receptacle is filled it is
capped and then moved to be grouped with the ten units to
indicate a complete ten unit. In step #3, the ten units with the
third receptacle are positioned in the second receptacle as
further illustrated in FIG. 6f-6g. After filling a second
receptacle indicating a sum of one hundred units it is added
with the remaining ten unit and two single counting cubes
giving a sum of one hundred and twelve.

Figure 7A:
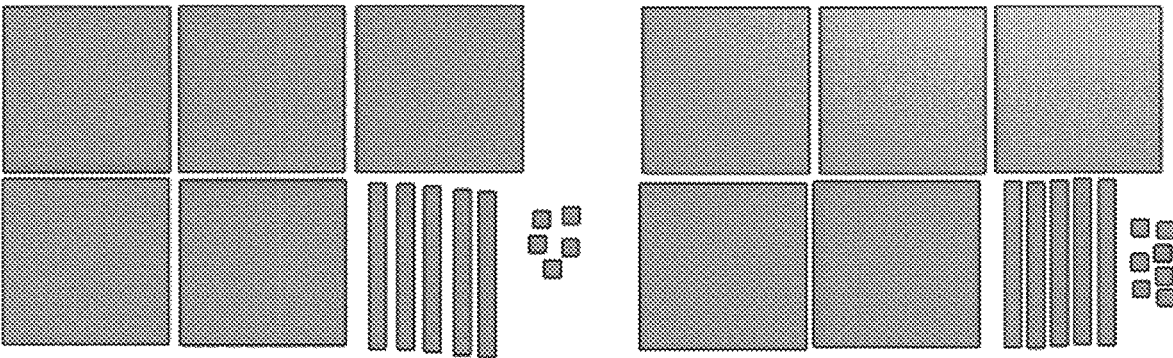
Figure 7B:
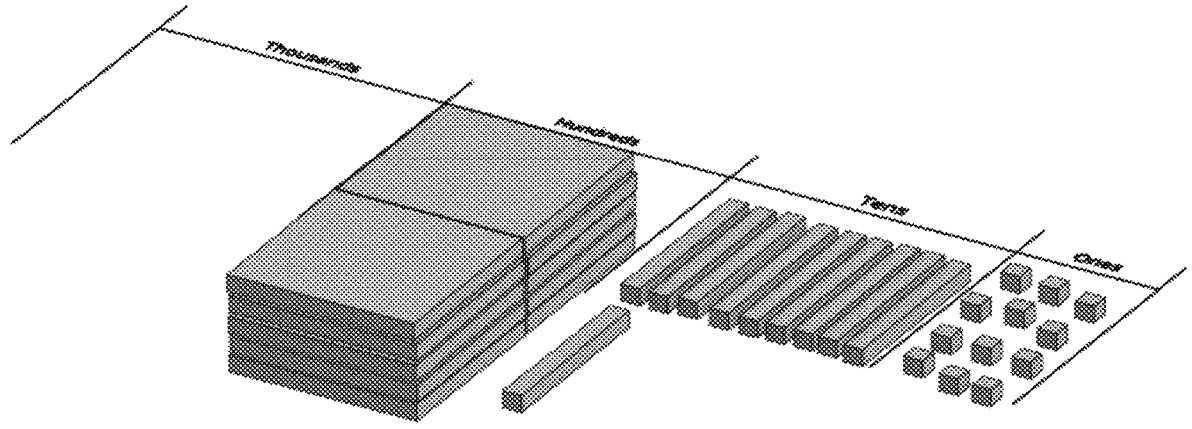
Figure 7C:
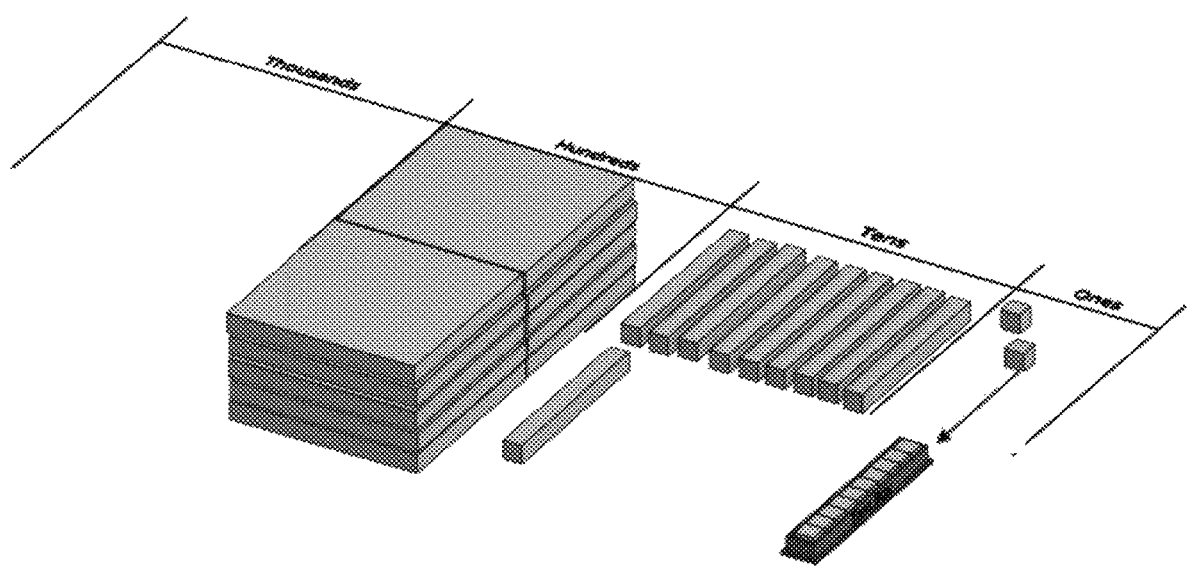
Figure 7D:
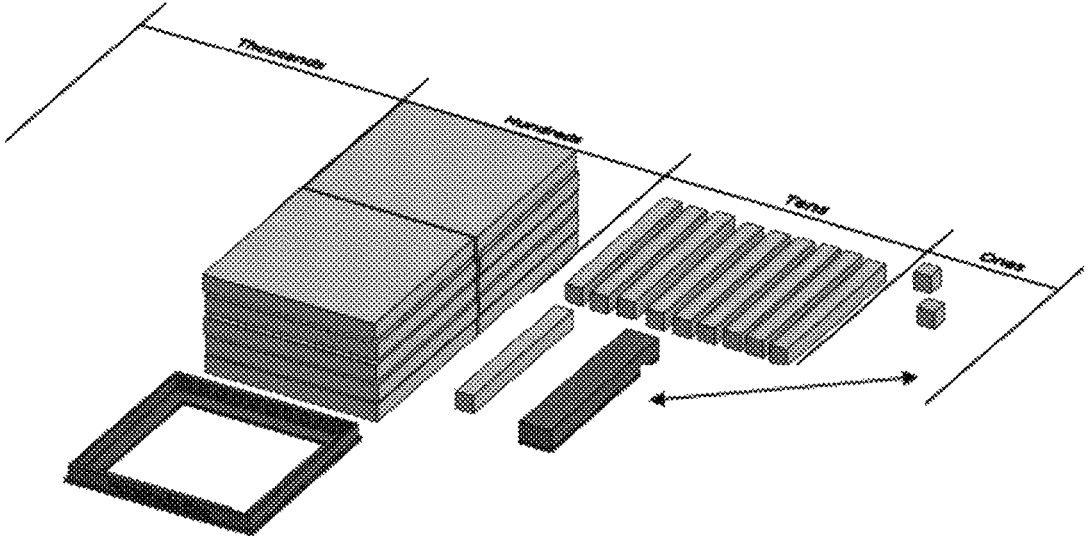
Figure 7E:
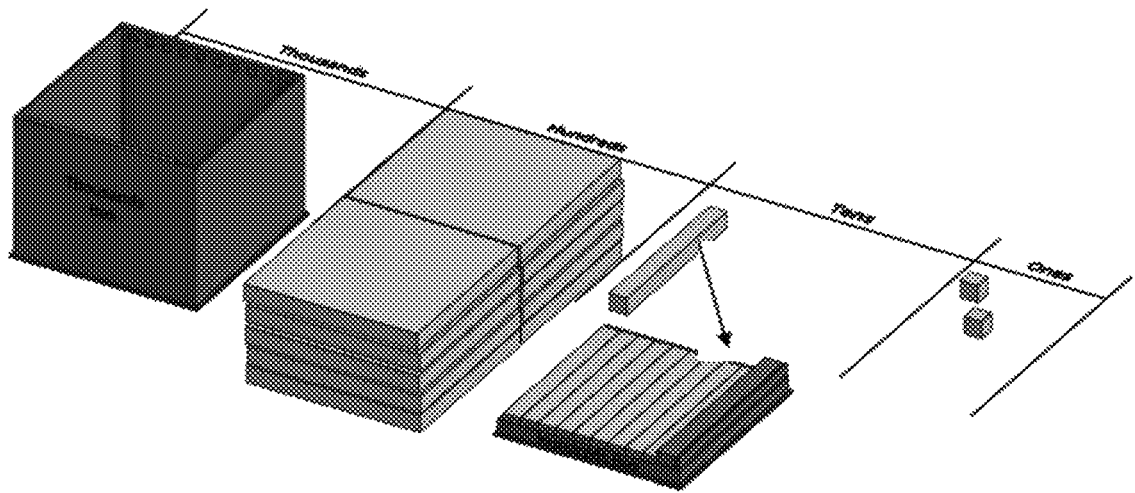
Figure 7F:
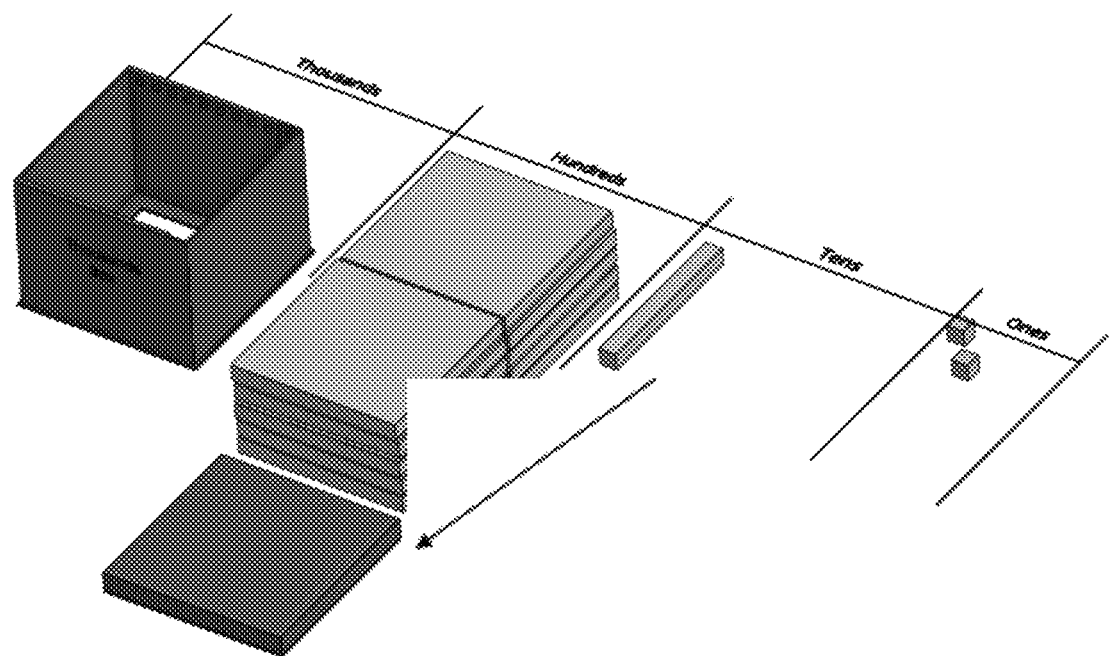
Figure 7G:
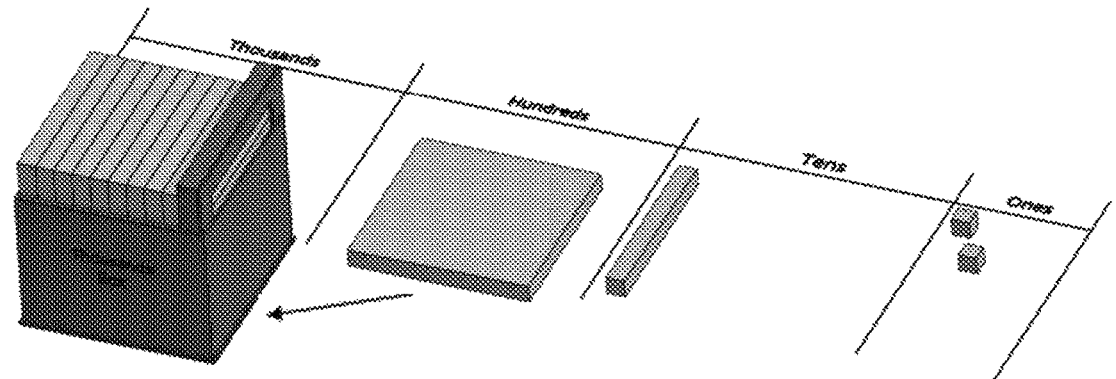
Figure 7H:
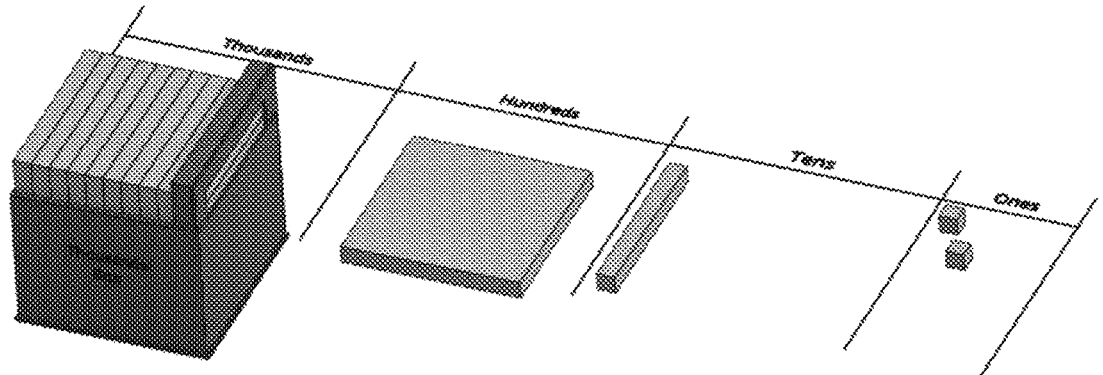

FIGS. 7a-7h further illustrate the utilization of the 3D
Regrouping Boxes to demonstrate an example using the
first, second, and third receptacles to determine the sum of
five hundred and fifty-five plus five hundred and fifty-seven.
FIGS. 7a-7b, illustrates base ten counting cubes, with five
units of hundreds, ten units of tens, and twelve units of ones.
FIG. 7c-7e, goes on to illustrate step #1 utilizing the third
receptacle with the single counting cube. Step #2 further
illustrates that once the third receptacle is filled it is capped
and then moved to be grouped with the ten units to indicate
a complete ten unit. FIG. 7e, step #3, the ten units with the
third receptacle are positioned in the second receptacle. FIG.
7f, step #4 once the second receptacle is filled this indicates
a sum of one hundred units, the receptacle is capped off and
added with the hundred units which in turn is placed within
the first receptacle as indicated in FIGS. 7g-7h. Once the first
receptacle is filled it is capped to indicate that there is one
thousand counting cubes and the remaining one hundred
unit, and one ten unit and two single counting cubes gives
a sum of one thousand one hundred and twelve as illustrated
in FIG. 7h.

What is claimed is:
1. An arithmetic tool comprising:
one first receptacle,
ten second receptacles,
a hundred third receptacles, and
a thousand counting cubes;
wherein the first receptacle is configured to hold the ten
second receptacles;

wherein each of the ten second receptacles are configured to hold ten of the third receptacles;

wherein each of the hundred third receptacles are configured to hold ten of the counting cubes;

wherein each of said first, said second, and said third receptacles is dimensioned to receive the respective number of said receptacles or said cubes in a nested arrangement;

wherein said first receptacle is a hollow cube having four side walls, a base wall with a partial opening, and an open top side, wherein said base wall includes an inner perimeter ledge configured to support ten of said second receptacles, and wherein said inner surfaces of said side walls include indentations and channels configured to guide and position said second receptacles;

wherein each of said second receptacles is a hollow quadrilateral with four congruent sides and four vertices, wherein said second receptacle includes an open side and a partially open opposite side with an inner perimeter ledge having a length of ten counting cube units and a height and width of one counting cube unit, configured to receive said third receptacles, and wherein said inner surfaces include indentations and channels for alignment and guidance; and wherein each of said third receptacles is a rectangular parallelogram having a channel with one open side, one closed side, and two raised side walls, each raised side wall having a height of one counting cube unit and a length of ten counting cube units, and wherein said channel includes indentations and channels for positioning and guiding the counting cubes.

2. The arithmetic tool of claim 1, wherein said first receptacle includes two or more vertically oriented said channels formed on inner surfaces of two or more said side walls, each said channel extending the full height of said side wall and configured to guide insertion of said second or said third receptacles; and wherein said indentations are positioned along said channels to indicate alignment points.

3. The arithmetic tool of claim 1, wherein a series of said indentations are formed along upper portions of said inner perimeter of said first receptacle, each spaced to correspond to the width of one counting cube, and said channels are provided to facilitate guided placement.

4. The arithmetic tool of claim 1, wherein an outer face of said first receptacle includes an overlay with one or more of a numeral, term, or design.

5. The arithmetic tool of claim 1, further comprising a fourth receptacle configured as a hollow cubic cover having one open side and one or more closed side walls, the open side being dimensioned to receive said first receptacle.

6. The arithmetic tool of claim 1, wherein said partially open side of said second receptacle includes an outer perimeter edge configured to engage with said channels of said first receptacle.

7. The arithmetic tool of claim 1, wherein said second receptacle includes said channels formed on inner surfaces of three or more side walls, each said channel having a vertical length of ten counting cube units, and indentations spaced to indicate said individual cube positions.

8. The arithmetic tool of claim 1, wherein said indentations are formed along said inner perimeter of the second receptacle, spaced to indicate said individual counting cube units, and said channels are configured to guide the insertion of said cubes.

9. The arithmetic tool of claim 1, further comprising a fifth receptacle configured as a hollow square cover having one open side and one or more closed side walls, said open side being dimensioned to receive said second receptacle.

10. The arithmetic tool of claim 1, wherein an outer periphery face of said second receptacle includes an overlay with one or more of a numeral, term, or design.

11. The arithmetic tool of claim 1, wherein said closed side of said third receptacle includes an outer perimeter edge configured to engage with said channels of said second receptacle for receiving one or more said third receptacles, and said indentations are provided for alignment.

12. The arithmetic tool of claim 1, further comprising a sixth receptacle configured as a hollow rectangular cover having one open side and one or more closed side walls, said open side being dimensioned to receive said third receptacle.

13. The arithmetic tool of claim 1, wherein an outer periphery face of said third receptacle includes an overlay with one or more of a numeral, term, or design.

* * * * *